US008456491B2

(12) United States Patent
Abrahamsson

(10) Patent No.: US 8,456,491 B2
(45) Date of Patent: Jun. 4, 2013

(54) SYSTEM TO HIGHLIGHT DIFFERENCES IN THUMBNAIL IMAGES, MOBILE PHONE INCLUDING SYSTEM, AND METHOD

(75) Inventor: Magnus Abrahamsson, Loddekopinge (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 942 days.

(21) Appl. No.: 12/545,519

(22) Filed: Aug. 21, 2009

(65) Prior Publication Data

US 2011/0037780 A1  Feb. 17, 2011

Related U.S. Application Data

(60) Provisional application No. 61/233,869, filed on Aug. 14, 2009.

(51) Int. Cl.
*G09G 5/373* (2006.01)
(52) U.S. Cl.
USPC .......................................... 345/666; 345/671
(58) Field of Classification Search
USPC .................. 345/666, 671; 382/219; 715/838; 348/333.05
See application file for complete search history.

(56) References Cited

U.S. PATENT DOCUMENTS

| 5,982,953 A | 11/1999 | Yanagita et al. |
| 2003/0222976 A1 | 12/2003 | Duran |
| 2006/0274960 A1 | 12/2006 | Tamaru |
| 2007/0216958 A1 | 9/2007 | Narukawa et al. |

FOREIGN PATENT DOCUMENTS

| EP | 0 977 132 A2 | 2/2000 |
| JP | 2007 019963 | 1/2007 |

OTHER PUBLICATIONS

Image Comparer, Bolide Software, Internet Archive Wayback, Apr. 1, 2008, pp. 1-3.*
Image Comparer, Bolide Software, Internet Archive Wayback, Aug. 11, 2008, pp. 1-2.*
International Preliminary Report on Patentablility, corresponding to PCT/IB2010/000313, date of issuance of this report, Feb. 14, 2012.
International Search Report, corresponding to PCT/IB2010/000313, mailed on Jun. 7, 2010.
Written Opinion, corresponding to PCT/IB2010/000313, mailed on Jun. 7, 2010.

* cited by examiner

*Primary Examiner* — Jeffery A Brier
(74) *Attorney, Agent, or Firm* — Renner, Otto, Boisselle & Sklar, LLP

(57) ABSTRACT

A method and apparatus in which thumbnail images are compared to differentiate between a selected image and one or more other images, and a difference image of the portion of the selected image that is different from one or more other images is determined. An enlarged view of a difference image that depicts the difference between the selected image and one or more other images is shown on a display. The apparatus and method may be carried out in various electronic devices, such as, for example, a general or special purpose computer, a mobile phone, or other electronic device.

14 Claims, 11 Drawing Sheets

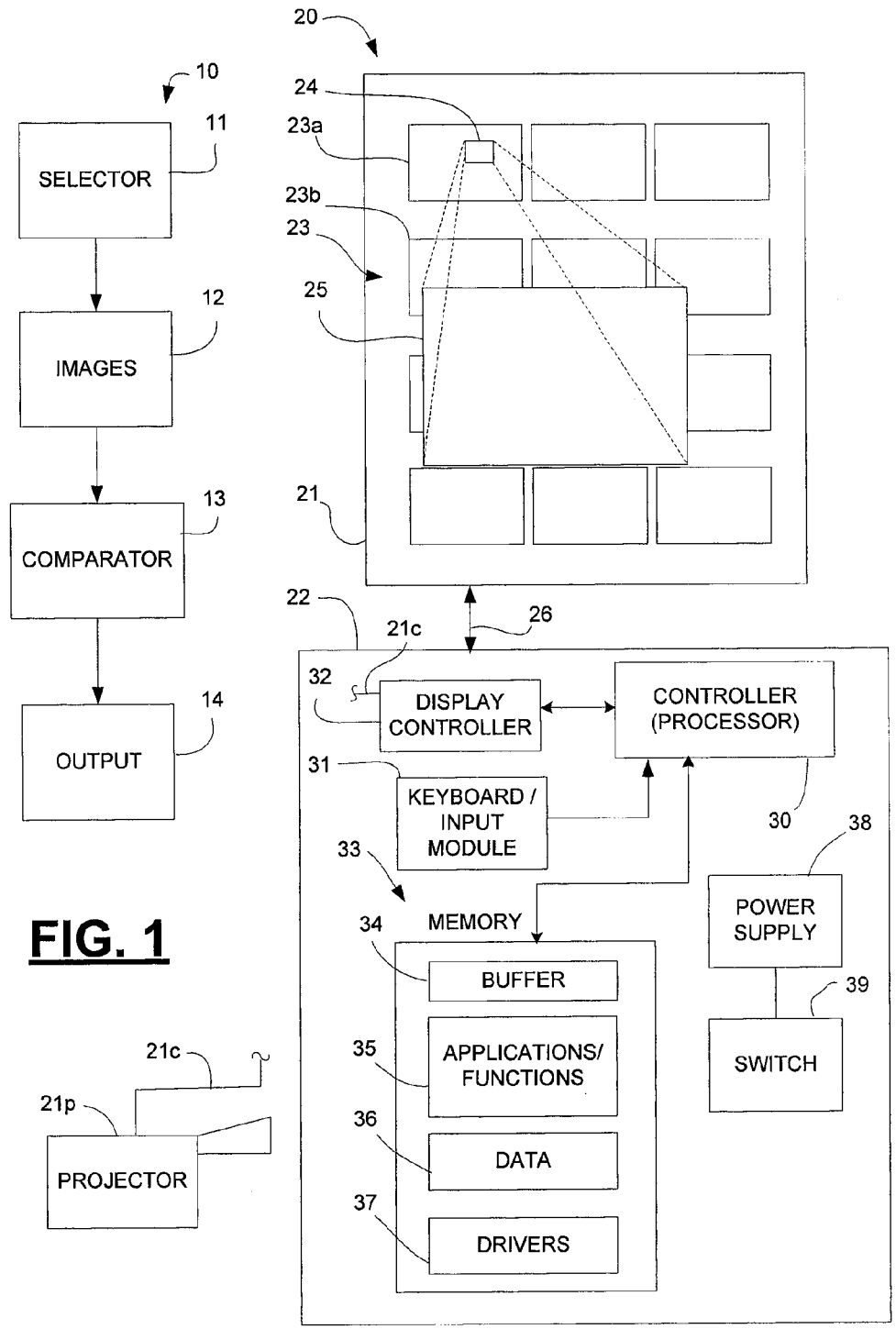

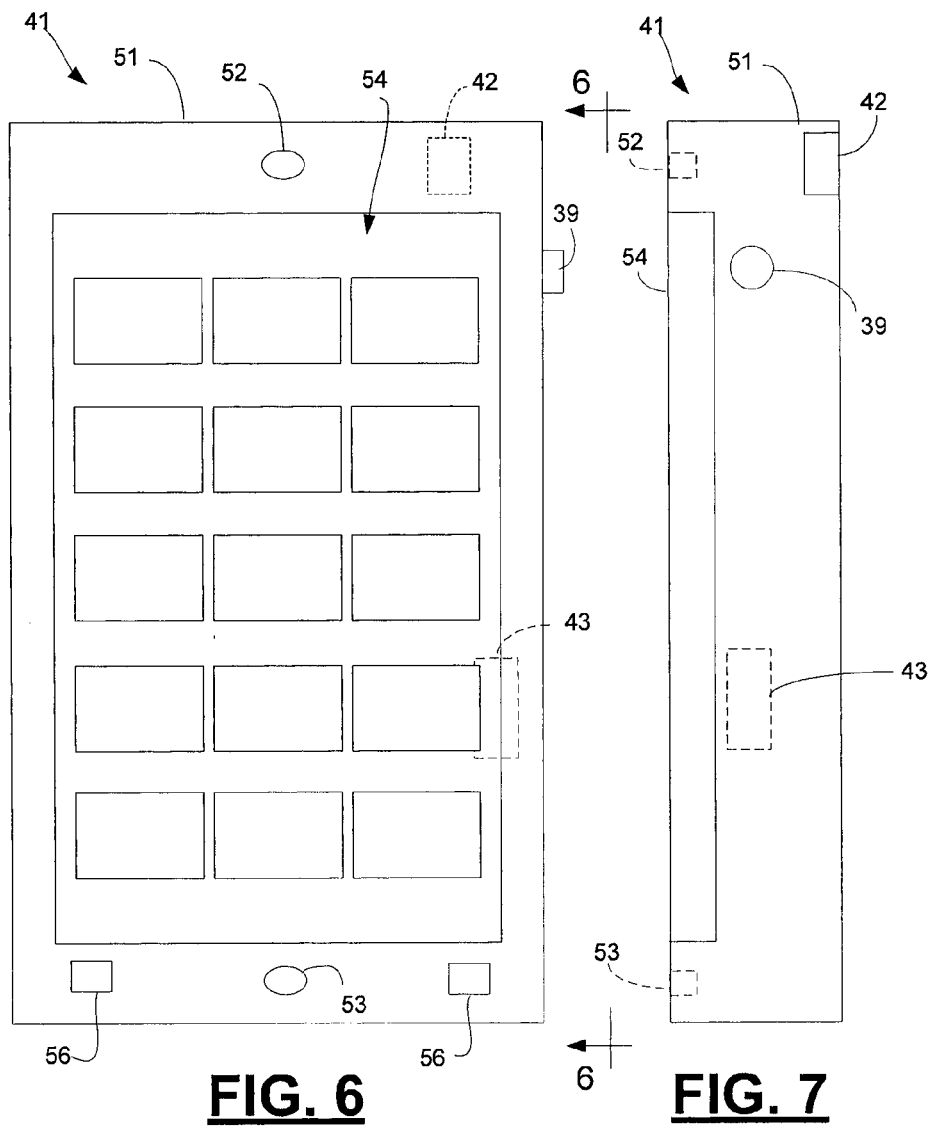

SYSTEM TO HIGHLIGHT DIFFERENCES IN THUMBNAIL IMAGES, MOBILE PHONE INCLUDING SYSTEM, AND METHOD

CROSS-REFERENCE TO RELATED APPLICATION

This application claims the benefit of U.S. Provisional Patent Application Ser. No. 61/233,869, filed Aug. 14, 2009, the entire disclosure of which is hereby incorporated by reference.

TECHNICAL FIELD

The present invention relates generally to highlighting of differences in thumbnail images shown by electronic equipment, to such electronic equipment and to a method for highlighting differences in thumbnail images.

BACKGROUND

Pictures (also referred to as images) may be stored in electronic equipment in a folder or album, e.g., an electronic folder or album contained in a storage or memory device. A common way to get an overview of the images is to show them as thumbnails. Thumbnails are miniature downsized variants of the real pictures. If there are a number of similar pictures there is a problem in that it is sometimes very hard to distinguish between thumbnails, since the small differences will not be visible in the downsized versions of the real pictures either because of the small size of the thumbnails as shown on a display, because of the resolution of the display, and/or because of the reduced amount of image data that may be shown in a thumbnail relative to the real picture. Sometimes a user may want to find a certain picture, but to find it the user would have to open each real picture and to view it in full size until the certain picture is found. The real pictures may be viewed by selecting a thumbnail or one of a group of thumbnails to bring up the real picture that is associated with that thumbnail or by sequentially displaying each of the real pictures until the certain picture is found; a problem is that these tasks are tedious and time consuming and sometimes may be inaccurate, for example, as it may be difficult to discern the differences between pictures when there are several very similar pictures. These problems are encountered in computers and their associated displays and in other electrical and electronic devices, such as, for example, mobile phones, digital cameras, and other devices used to take photographs and/or to display images. As will be appreciated, these problems may be compounded for devices that have relatively small displays because the thumbnails may be commensurately small and/or the number of thumbnails that can be shown at one time may be rather small.

With many pictures in a folder or album, a common way to get an overview is to show them as thumbnails. Thumbnails are miniature downsized variants of the real pictures. If you have many very similar pictures, it is sometimes very difficult to distinguish between these thumbnails, since the small differences will not be visible in the downsized version, e.g., in the thumbnails. Sometimes it is desired to find a certain picture, but to find it one would have to open each picture to view it in full size until the correct or desired picture is found.

Mobile and/or wireless electronic devices (also referred to below as electronic equipment) are becoming increasingly popular. For example, mobile telephones, portable media players and portable gaming devices are now in wide-spread use. In addition, the features and accessories associated with certain types of electronic devices have become increasingly diverse. To name a few examples, many electronic devices have cameras, text messaging capability, Internet browsing capability, electronic mail capability, video playback capability, audio playback capability, image display capability and hands free headset interfaces.

SUMMARY

Briefly, an aspect of the present relates to combining a thumbnail with an enlarged or original sized image of the parts that differ between images or thumbnails.

Another aspect relates to an image processing system including a selector adapted to select an image among a plurality of images as a selected image, a comparator adapted to compare the selected image with at least one other image to identify at least one generally corresponding part of the images that differentiate the images from each other, and an output adapted to provide from the identified part of the selected image a difference image that a. is smaller in image size than the selected image, and b. includes the identified differentiating part of the selected image to facilitate showing a difference between the selected image and the at least one other image with which the selected image is compared by the comparator.

Other aspects may include one or more of the following, wherein the difference image includes a contextual image portion to facilitate identifying the approximate location in the selected image of the difference image;

wherein after being selected the selected image is presented with a mark-up of the part that is used for the difference image to facilitate identifying the approximate location in the selected image of the difference image;

wherein the comparator is adapted to compare the selected image or a thumbnail representation of the selected image with another image or another thumbnail representation of such another image to identify at least one corresponding part in the compared thumbnails or images that differ from each other to provide the difference image;

further including a display;

wherein the selector includes a touch sensitive or proximity sensitive display;

wherein the output is adapted to provide for showing on the display the difference image enlarged relative to the size of a thumbnail representation of the selected image;

wherein the output is adapted to provide for showing on the display the difference image enlarged relative to the size of a thumbnail representation of the selected image simultaneously showing the thumbnail representation of the selected image; and/or wherein the output is adapted to provide for showing on the display the difference image enlarged relative to the size of a thumbnail representation of the selected image simultaneously showing the thumbnail representation of the selected image with a mark-up of the part that is used for the difference image to facilitate identifying the approximate location in the selected image of the difference image.

Another aspect relates to an image processing system, including a display adapted to show a plurality of thumbnail representations of respective images, a selector adapted to select at least one of the images by selecting a respective thumbnail, a comparator adapted to compare the selected image or the thumbnail representation of the selected image with another image or another thumbnail representation of such another image to identify at least one generally corresponding part in the compared thumbnails or images that differ from each other to provide a difference image, and operating circuitry adapted to show on the display an enlarged image of the difference image relative to the size of the thumbnail representations.

Other aspects may include one or more of the following, further including a memory adapted to store images, a processor, and operative programming adapted to compare images and to prepare a difference image;

wherein the comparator is adapted to carry out the comparison on a pixel by pixel basis of respective images or thumbnails or a group of pixels by group of pixels basis of respective images or thumbnails;

wherein the comparator is adapted to carry out the comparison based on analysis of focus characteristics of respective images or portions of respective images; and/or further including a camera adapted to provide images.

Another aspect relates to electronic equipment system, including a camera, operating circuitry, including memory adapted to store a plurality of images received by the camera, a selector to select a respective image, and a comparator adapted to analyze respective images to determine generally comparable part(s) that differ, and an output adapted to provide a difference image of the differing part(s) between compared images, and further including a display, and wherein the operating circuitry is adapted to provide respective thumbnails of a plurality of images to be shown on the display.

Other aspects may include one or more of the following, wherein the output is adapted to provide for showing on the display the difference image enlarged relative to the size of a thumbnail representation of the selected image;

wherein the difference image is cropped from the selected image to be smaller in image size than the selected image and includes the identified part of the selected image to facilitate showing a difference between the selected image and the at least one other image with which the selected image is compared by the comparator;

wherein the display is adapted to show simultaneously a plurality of thumbnails representing respective images;

wherein the display is adapted to show simultaneously a plurality of images in thumbnail form including the selected image, the difference image together with contextual image in enlargement relative to the size of the respective thumbnails, and in a thumbnail of the selected image a highlighted or otherwise designated portion corresponding to the difference image;

wherein the difference image comprises a highlighted or otherwise designated portion of a thumbnail of the selected image;

wherein the comparator is adapted to compare the selected image or a thumbnail representation of the selected image with a plurality of other images or thumbnail representations of such other images to determine based on a relationship to the selected image or thumbnail representation of the selected image a specified other image or thumbnail representation of the specified other image for comparison with the selected image or thumbnail representation of the selected image;

wherein the relationship is similarity to the selected image;

wherein the selector includes comparing circuitry and operative programming to select from among a number of images a number of similar images for displaying as thumbnails from which to select a selected image;

a mobile phone including circuitry for making and receiving telephone calls, and the system as above;

any mobile device capable of showing images; and/or a general purpose computer.

Another aspect of the invention relates to a method of displaying images, including displaying a number of thumbnails of real images, selecting a thumbnail of interest, comparing the real image represented by the thumbnail with another image to determine differences, and displaying a view of the differing part(s) of the images in enlarged size relative to the size of the thumbnail.

Other aspects may include one or more of the following, further including displaying the selected thumbnail of interest at the same time that the view of differing part(s) is displayed;

the displaying of the selected thumbnail of interest at the same time comprising highlighting the differing part(s);

the displaying a view of the differing parts comprising displaying only the differences as a difference image together with contextual image to facilitate identifying location in the selected image of the difference image;

the steps being carried out on a mobile phone or another mobile device capable of showing images; and/or the steps being carried out on a general purpose computer.

Another aspect of the invention relates to a method of displaying images, including displaying a number of thumbnails of real images, selecting a thumbnail of interest, comparing the real image represented by the thumbnail with another image to determine differences, and displaying a view of only the differences as a difference image together with contextual image to facilitate identifying location in the selected image of the difference image.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

In the annexed drawings:

FIG. 1 is a schematic block diagram of a system in accordance with an embodiment of the invention;

FIG. 2 is a schematic front plan view of electronic equipment, such as, for example, a general purpose or special purpose computer;

FIG. 6 is a schematic front plan view of electronic equipment, such as, for example, a portable electronic device, e.g., in the form of a mobile phone;

FIG. 7 is a schematic side elevation view of the mobile phone of FIG. 6, looking in the direction of arrows 7-7 of FIG. 6;

DESCRIPTION

Figure 3:
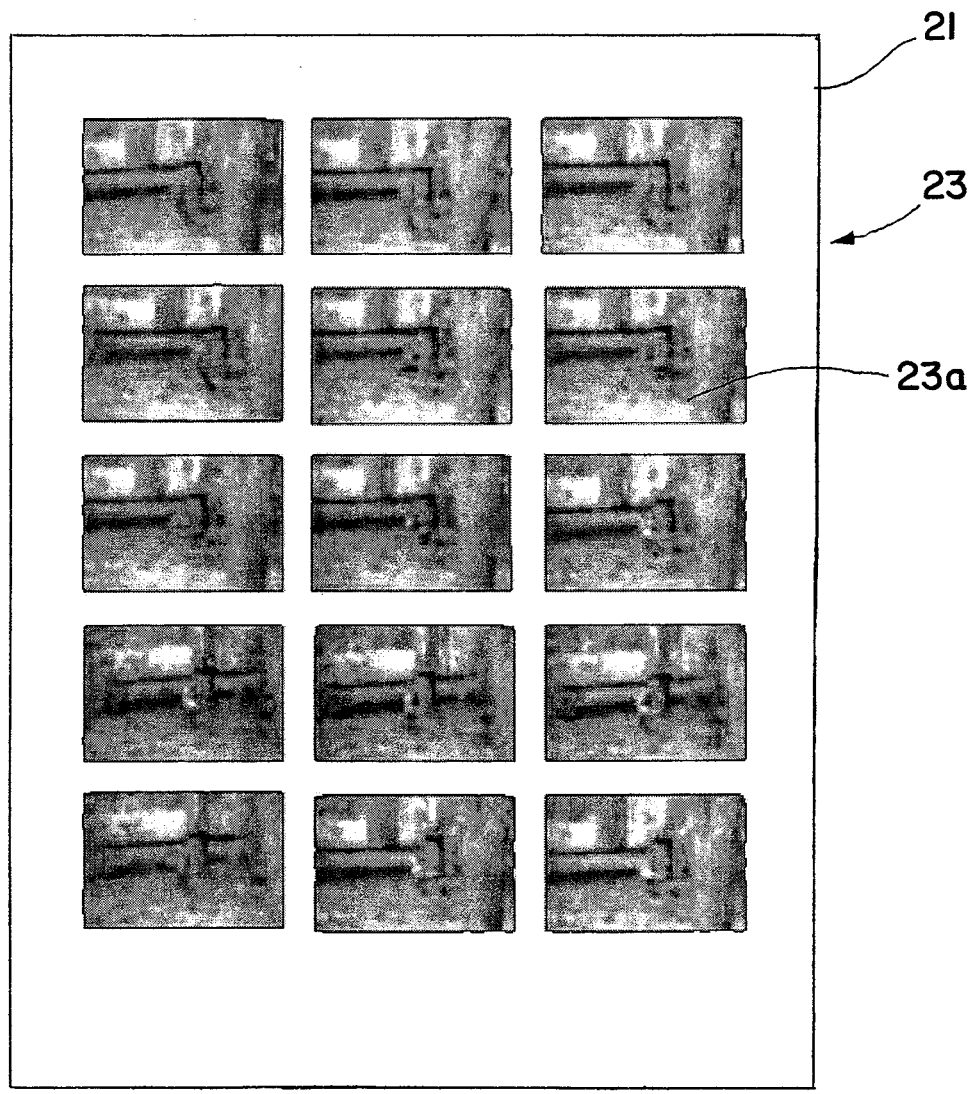
FIG. 3 is a schematic view of a display screen with a plurality of thumbnail images thereon.

The interchangeable terms "electronic equipment" and "electronic device" include general and special purpose computers, portable radio communication equipment and also may include other devices used to take, to record and/or to display photographs or other images. The term "portable radio communication equipment," which hereinafter may be referred to as a "mobile radio terminal," as "portable electronic equipment," or as a "portable communication device," includes all equipment such as mobile telephones, pagers, communicators, electronic organizers, personal digital assistants (PDAs), smartphones, portable communication apparatus or the like.

In the present application, embodiments of the invention are described in the context of a computer and a display associated with a computer. Embodiments also are disclosed in the context of a portable electronic device in the form of a mobile telephone (also referred to as "mobile phone"). However, it will be appreciated that the invention is not intended to be limited to the context of a mobile telephone and may relate to any type of appropriate electronic equipment, examples of which include a media player, a gaming device, a PDA, a computer, digital cameras, other mobile devices capable of showing images, etc.

In the description herein reference is made to pictures, photographs, images and the like and reference is also made to thumbnail images (sometimes simply referred to as thumbnails). Thumbnails are reduced-size versions of pictures and typically are used to help in recognizing and organizing pictures, for example, serving for pictures a role that is similar to the role that is served by normal text index for words (or groups of words, such as a section of a book, newspaper, article, etc.). Various techniques may be used to prepare thumbnails from pictures, as is known in the art.

Also, in the description herein, reference is made to showing images on a display. The display may be a device that is directly viewed, e.g., by looking at the display of a mobile phone, of another mobile device, of a free-standing monitor or a monitor or display of a portable computer, such as a laptop computer, notebook computer or other computer, displays of a head mounted viewing system, such as a virtual reality viewing system, heads up display systems, and so on. Other means may be used to show images. As used herein, the term display may mean virtually any device that is able to show images whether by direct viewing, projection or otherwise.

Software algorithms exist to compare pictures and to find similarities and differences. One example of comparison software is "Image Comparer" sold by Bolide Software and by SWREG Inc. of Eden Prairie, Minn., USA. Other examples of comparison software concepts are used in various data compression software.

In an embodiment of the present invention, pictures are compared and the differences between a plurality, even many, similar pictures, when they are presented as thumbnails, are highlighted. For example, when resting a pointer or cursor over one of several thumbnails, a comparison is made and a picture of the differentiating part will be enlarged, e.g., larger than the original thumbnail, even up to full screen size and shown on the display of the electronic device. If the display screen is a touch sensitive screen or a proximity sensing screen, placing a finger, stylus or the like in engagement with or in proximity to a given thumbnail to select that thumbnail will commence the described operation to obtain an enlarged difference image. Further description of the invention is presented below.

Turning to FIG. 1, a system for highlighting differences in thumbnail images is generally indicated at 10. The system 10 includes a selector 11 to select an image among a plurality of images as a selected image. The plurality of images 12 from which the selection may be made may be stored in a storage device, such as, for example, a computer memory of some type, a camera memory, or the memory of some other electronic device, and so on. The images may be stored locally or may be accessed from a remote storage location or may be otherwise provided. As an example, the images may be relatively full-size images, pictures, etc. that contain all of the data representing the particular image or the image may be a thumbnail of the fall image. The system 10 also includes a comparator 13 that is adapted to compare the selected image, e.g., the selection being made by the selector 11 from images 12, with at least one other image to identify at least one generally corresponding part of the compared images that differentiates the compared images from each other. The comparator 13 may do the comparison based on the full image or based on thumbnails representing respective full images. The comparator may include hardware and/or software, e.g., a series of method steps for operating a processor and associated components of a computer, mobile phone, or other electronic device. The results from the comparison made by the comparator 13 of the system 10 are provided the output 14. The output 14 shows at least an enlargement of an area of a selected thumbnail that is different from other images in the plurality of images that were compared by the comparator 13. The enlargement that is provided by the output 14 is shown on a display of the electronic device that includes the system 10; additionally or alternatively, the enlargement that is provided by the output 14 may be provided to and projected by a projector (projection display), e.g., by projection on a screen or the like. The output 14 may include electronic signals or data representing the mentioned enlargement of an area of a selected thumbnail, and/or it may include the display on which the mentioned enlargement is shown along with other thumbnails.

As is described in greater detail below with respect to the several drawing figures, a method of displaying images in accordance with an embodiment of the invention includes displaying a number of thumbnails of real images, for example, photographs, pictures, or other images. That displaying step may be carried out using images 12 that are stored or otherwise provided. The method also includes selecting a thumbnail of interest, for example, using the selector 11. A real image represented by its thumbnail is compared with another real image to determine differences, for example, by the comparator 13. If desired, instead of comparing real images, thumbnails may be compared in accordance with an embodiment of the invention. A differing part or parts of the images, as are determined in the comparing step, are displayed in enlarged size relative to the size of the original thumbnail. The enlarged size may be larger than a given thumbnail or may be the same size as a thumbnail but only the image difference(s) is shown in the area of the given thumbnail.

With the above in mind, then, a system for highlighting differences in images, for example, in thumbnail images, provides for the comparing of a plurality of images, e.g., a group of images, relative to a selected image. Thus, a given image may be selected, and that image may be compared with one or more other images, the other images, for example, being referred to as a group of images. The images that are compared may be full images or thumbnail images representing respective full images. The results from the comparison are shown in a portion of a thumbnail of a selected image. That portion is referred to below as a "difference image." That difference image may be shown in enlarged size relative to the size of the original thumbnail and may be referred to below as an "enlarged difference image."

Referring to FIG. 2, an electronic device in the form of a computer system 20 is illustrated. The computer system is an example of electronic equipment including a system for highlighting differences in thumbnail images. The computer system 20 may be a general purpose computer, e.g., a personal computer, a handheld computer, and so on. The computer system 20 may be a special purpose computer, such as, for example, a computer intended for photography use, multimedia use, or some other special purpose. The computer system 20 includes a display 21 and an electronics portion 22. The display 21 may be a liquid crystal display, plasma display, cathode ray tube (CRT) display, or virtually any other type display. The display 21 may be a touch-sensitive display such that upon pressing an area of the display an input is provided to the electronics portion 22 of the computer system 20; various types of touch-sensitive or proximity-sensitive displays are known.

As is illustrated in FIG. 2, a number of images 23 are shown on the display. The images are a plurality of thumbnails, such as thumbnails 23a, 23b, and so on. In the illustration of FIG. 2 the display 21 is set up to show 12 thumbnails, respectively in four rows and three columns. The arrangement or setup of the display and the manner in which thumbnails 23 are shown on the display may be other than a four-row by three-column array. The display 21 may be a direct view display, e.g., one that is looked at by a user, or some other type of display. An example of another type of display is a projector, which is shown schematically at 21p in FIG. 2.

In the illustrated embodiment of FIG. 2, the thumbnail 23a is considered the selected image. For example, a user of the computer system 20 may have selected the thumbnail 23a by pressing the area of the display 21 where the thumbnail 23a is shown. Alternatively, the thumbnail 23a may be otherwise selected, e.g., using the electronics portion 22 of the computer system 20. The thumbnail 23a is compared with one or more of the other images 23 that are shown on the display 21. The one or more portions of the selected image that differ(s) with corresponding portion(s) of the image(s) with which the selected image is compared is determined as the difference image, which is shown at 24 in FIG. 2. The difference image 24 may include both the portion of the selected image that is different from the image(s) with which the selected image was compared and also some contextual image information, such as, for example, some adjacent image information to help put into context the difference image relative to the thumbnail 23a, for example.

The computer system 20 also shows on the display 21 an enlarged difference image 25. The enlarged difference image is an enlargement of the difference image 24, and it is shown such that the difference image is larger than it appears in the thumbnail 23a. The size of the enlarged difference image may be, for example, the same as the size, e.g., occupy the same area, as one of the thumbnails 23 or, as is illustrated, the size of the enlarged difference image 25 may be greater in area than one of the thumbnails 23, as is illustrated in FIG. 2. The enlarged difference image may cover one or more thumbnails 23 or portions of one or more thumbnails, as is illustrated in FIG. 2. The enlarged difference image facilitates a user seeing and understanding which part(s) of the selected image is different from the one or more other images 23. It is noted that the size of the enlarged difference image 25 may actually be smaller in area than one of the thumbnails 23, but even if that were the case, since the enlarged difference image contains primarily the portion of the selected thumbnail 23a that is different from the other image(s) possibly also together with some contextual material, the user will be able to discern relatively easily the different part(s) of the selected thumbnail, e.g., part(s) that differentiate from the image with which the selected image is compared. The difference image may be cropped from the selected image to be smaller in image size than the selected image and includes the identified part of the selected image to facilitate showing a difference between the selected image and the at least one other image with which the selected image is compared by the comparator. The output may provide for showing on a display is adapted to provide for showing on the display the difference image enlarged relative to the size of a thumbnail representation of the selected image simultaneously showing the thumbnail representation of the selected image.

The computer system 20 may be operative to compare the selected image 23a with a single other one of the images 23. The computer system 20 may be operative to compare the selected image 23a with a plurality of the other images 23. The plurality of other images may be all of those or some of those shown on the display 21 at any given time or may be compared with other images 12 (FIG. 1) including those shown and/or those not shown on the display 21. The computer system 20 may make a determination as to which of the images 23 is most similar to the selected image 23a and then may do the comparison by the comparator 13 to determine the difference image. The computer system 20 may determine which portion(s) of respective images 23 are most significant and may make the comparison based on the most significant portion(s). In making the comparison, the comparator 13 may make a determination which portion of the selected image is most different from generally corresponding portion(s) of other images 23 and may determine the difference image based on what is the most different portion. Other possibilities for comparison also may be used. Computer software to carry out the various comparisons on a pixel-by-pixel or area-by-area, color-by-color, or some other comparison basis can be carried out by appropriate computer software operating the electronics portion 22 of the computer system 20 to achieve the determining of a difference image and showing it as an enlarged difference image as is described herein.

The electronics portion 22 of the computer system 20 for carrying out the various functions described above, for example, may be a conventional general purpose or special purpose digital computer or other type of computer. The electronics portion 22 is coupled by an appropriate connection 26 to the display 21. The electronics portion includes a controller or processor 30, such as, for example, a microprocessor, a keyboard/input module 31, a display controller 32, and a memory 33. The keyboard/input module may include a mouse, joystick, trackball, keyboard, and/or other devices used to provide inputs to a computer system 20, e.g., in conventional manner. For example, a mouse may be used to move a cursor to point to selected image 23a or some other selected image, and a switch, such as a click switch or the like may be operated on the computer mouse to effect the selected function by providing an appropriate signal to the controller 30.

The keyboard/input module 31 may include computer software or instructions, e.g., as is available on mobile phones sold by Sony Ericsson Mobile Communications, AB, of Lund, Sweden, to provide selection or shift of focus between objects on a display screen, such as thumbnails. Such computer software or instructions provides for selection of objects, e.g., thumbnails, by moving a selection marking, such as a bold font, different background, animations, or simply a rectangle around the selected object by one or more key presses. The key presses may be, for example, pressing of arrow keys up, down, left, or right, or by manipulating a joystick.

The display controller 32 may operate via the connection 26 to provide signals to the display 21 to carry out displaying various images 23, the enlarged difference image 25, and other alphanumeric information or data, images, icons, etc. As is schematically illustrated, a connection 21c may be provided to connect the display controller 32 to operate a projector 21p to project images for viewing via projection onto a screen, via a heads up display system, via a virtual reality display system, head mounted display system, and so on. The display 20 may be used to provide via the connection 26 signals to the display controller 32 to indicate that a portion of the display has been touched, for example, or otherwise operated to provide an input to the display controller; and that input, e.g., in the form of one or more signals, may be provided the controller 30 to carry out various functions by the computer system 20.

The memory 33 may include several portions, including, for example, a buffer 34, applications and functions section 35, data storage section 36, and drivers 37. The memory may include other portions, as well, e.g., the memory may be a solid state memory, a hard drive, a tape drive, or any other memory device. The various portions 34-37 may be simply different parts of the memory or may be individual memory units themselves, as desired. The buffer may facilitate providing and receiving signals, data, instructions, etc. with respect to the controller 30 and/or with other parts of the computer system 20. The applications/functions portion of the memory 33 may contain computer programs and other functional control instructions for the computer system. Data may be stored in the data portion 36. Various drivers to coordinate operation of the computer system 20 with internal parts, the display, and/or other devices, e.g., communications devices, printer devices, etc., may be included in the drivers section 37. A power supply 38 and on/off switch 39 may be provided the computer system 20. The power supply 38 may be a conventional computer power supply that provides electrical power to the various parts of the computer system 20.

Further description will be provided below regarding functions carried out by the electronics portion 22 of the computer system 20. It will be appreciated that the various functions and operations described herein may be carried out by the computer system 20 using appropriate computer software, e.g., to make the described comparisons, to determine difference images, to highlight difference images, to enlarge difference images as enlarged difference images and to show them on the display, and so on. A person who has ordinary skill in the art would be able to prepare the appropriate computer software, either by writing the software, and/or by adapting existing commercially available software to carry out the functions described herein.

Figure 4:
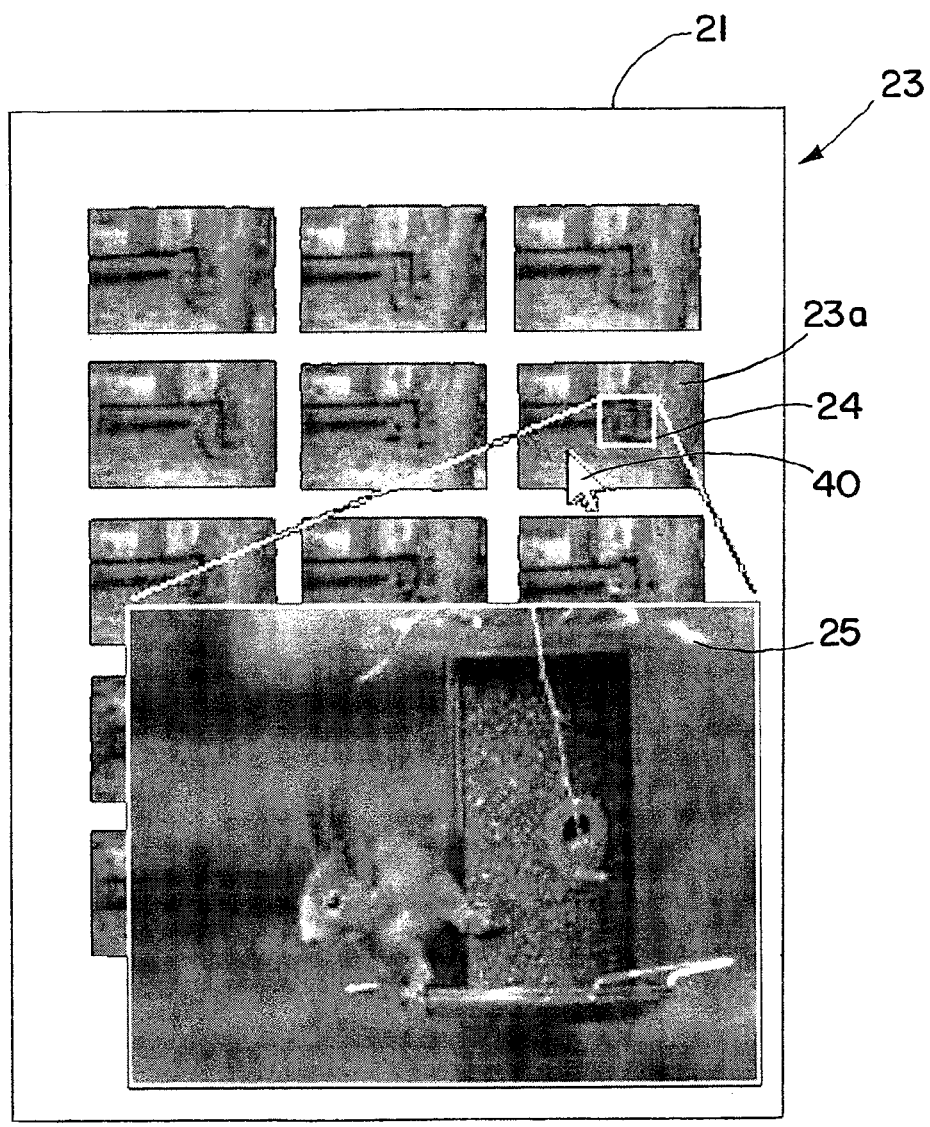
FIGS. 4 and 5 are schematic views of the display screen of FIG. 3 showing different respective selected thumbnail images, a difference image and an enlarged difference image.
Figure 5:
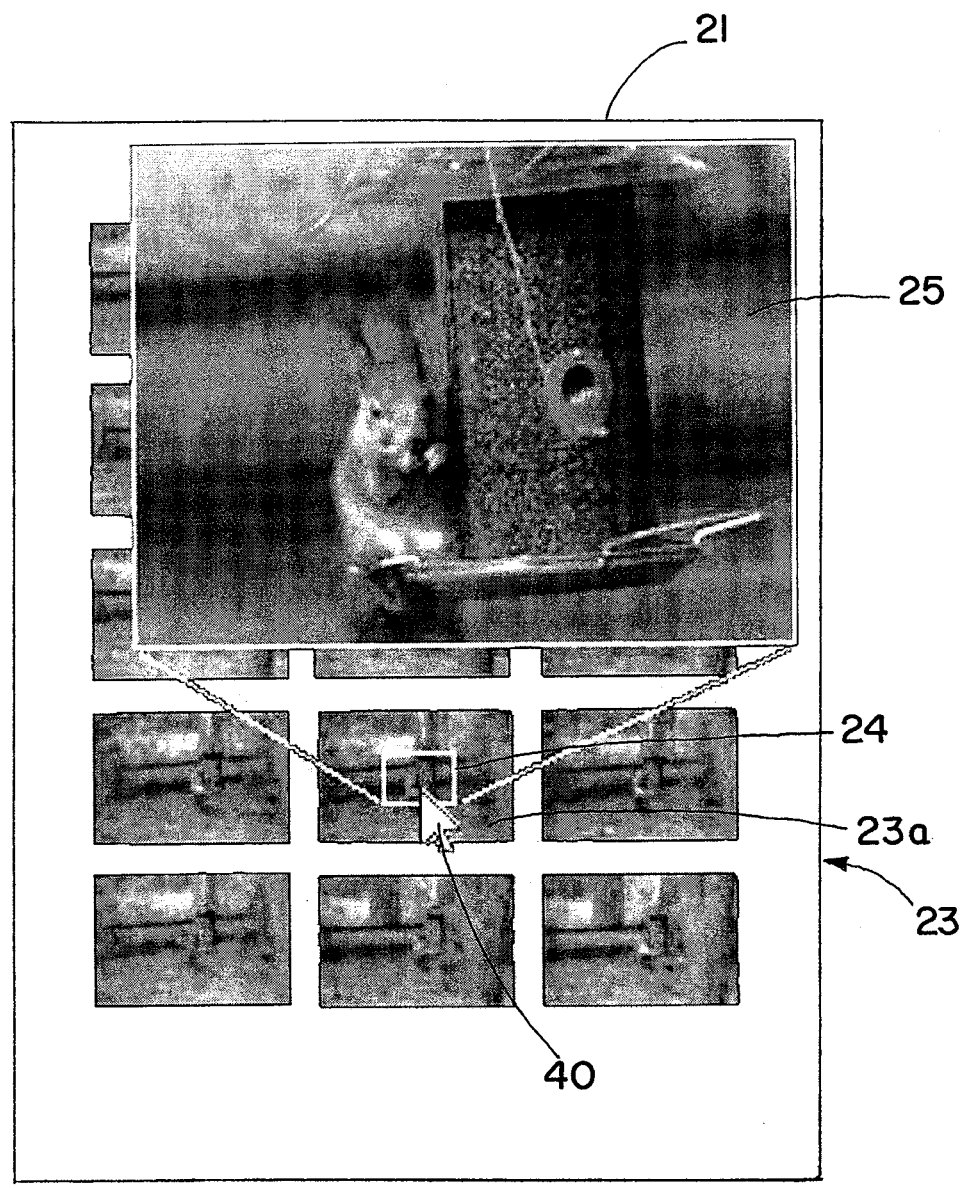

Briefly referring to FIGS. 3, 4 and 5, several screenshots of the display 21 depict a manner of operating the invention. In FIG. 3, a normal view of fifteen thumbnail images 23 is shown on the display 21. All thumbnail images (pictures) look about the same and it is nearly impossible to see differences between thumbnails. A selected image 23a is to be identified. The system 10, such as, for example, the computer system 20, may carry out the functions described herein to determine which portion of the selected image is different or is most different from one or more of the other images 23. As is mentioned above, the comparisons may be done on the original, full sized images and not on the thumbnails, or the comparison may be done on the thumbnails. As is seen in FIG. 3, it is quite difficult to determine differences between respective thumbnail images 23, all of which are rather similar to each other.

FIG. 4 illustrates the result of carrying out the invention wherein the system 10, such as the computer system 20, has determined a difference image 24 in a selected image 23a, and has caused to be shown on the display 21 an enlarged difference image 25. For example, when the user directs the pointer or cursor 40 over one thumbnail image, e.g., operating the keyboard/input module 31, for example a computer mouse or other pointing or cursor moving device, of the computer system 20 (FIG. 2), or touches that image, the part of that thumbnail that differentiates that picture from the others is enlarged and presented to the user. Note that it is not the whole picture that is shown in the enlarged difference image; the enlarged difference image is only that part of the selected picture that is different. The difference image 25 shows the animal looking toward the left side of the drawing while contextual information is shown, such as parts of an animal feeder device on which the animal is standing. If desired, the system 10, such as the computer system 20, for example, may, in addition to causing the enlarged difference image 25 to be shown on the display 21, may outline the difference image directly on the selected image thumbnail 23*a*, as is shown in white outline in FIG. 4 on the selected image thumbnail. Alternatively and/or additionally, the system 10, such as the computer system 20, for example, may show part or the entire difference image 24 in a highlighting or different coloring than other portions of the selected image thumbnail 23*a* to facilitate identifying where in the selected image thumbnail is the difference image. The other thumbnail images 23 shown on the display 21 in FIG. 4 may show the animal facing in a different direction than that of the selected image. The difference image enlarged relative to the size of a thumbnail representation of the selected image may be shown simultaneously with the thumbnail representation of the selected image and highlighting of the difference image on the thumbnail of the selected image.

In FIG. 5 the cursor 40 has been moved, e.g., by operating the keyboard/input module 31, to point to a different selected image shown on the display 21. The enlarged difference image 25 shown in FIG. 5 is the part that differentiates this selected picture from the others, and it is the result of comparing the selected image 23*a* of FIG. 5 with one or more other images, e.g., as was described above. As is seen in FIG. 5, the enlarged difference image 25 shows the animal facing straight ahead and also shows some contextual material, for example, the animal feeder device, as was mentioned above. Thus, it will be appreciated that the invention may be used to compare any of the thumbnail images shown on the display with one or more other images. The other images may be a group of images having some relationship to each other, e.g., same color, same primary feature, e.g., an image of an animal, an image of a flower, an image of a person, and so on. A difference image is determined by a comparator, e.g., a comparator function carried out in electronics portion 22 of the computer system 20, and an enlarged difference image may be provided for showing on the display, as has been described above.

Figure 8:
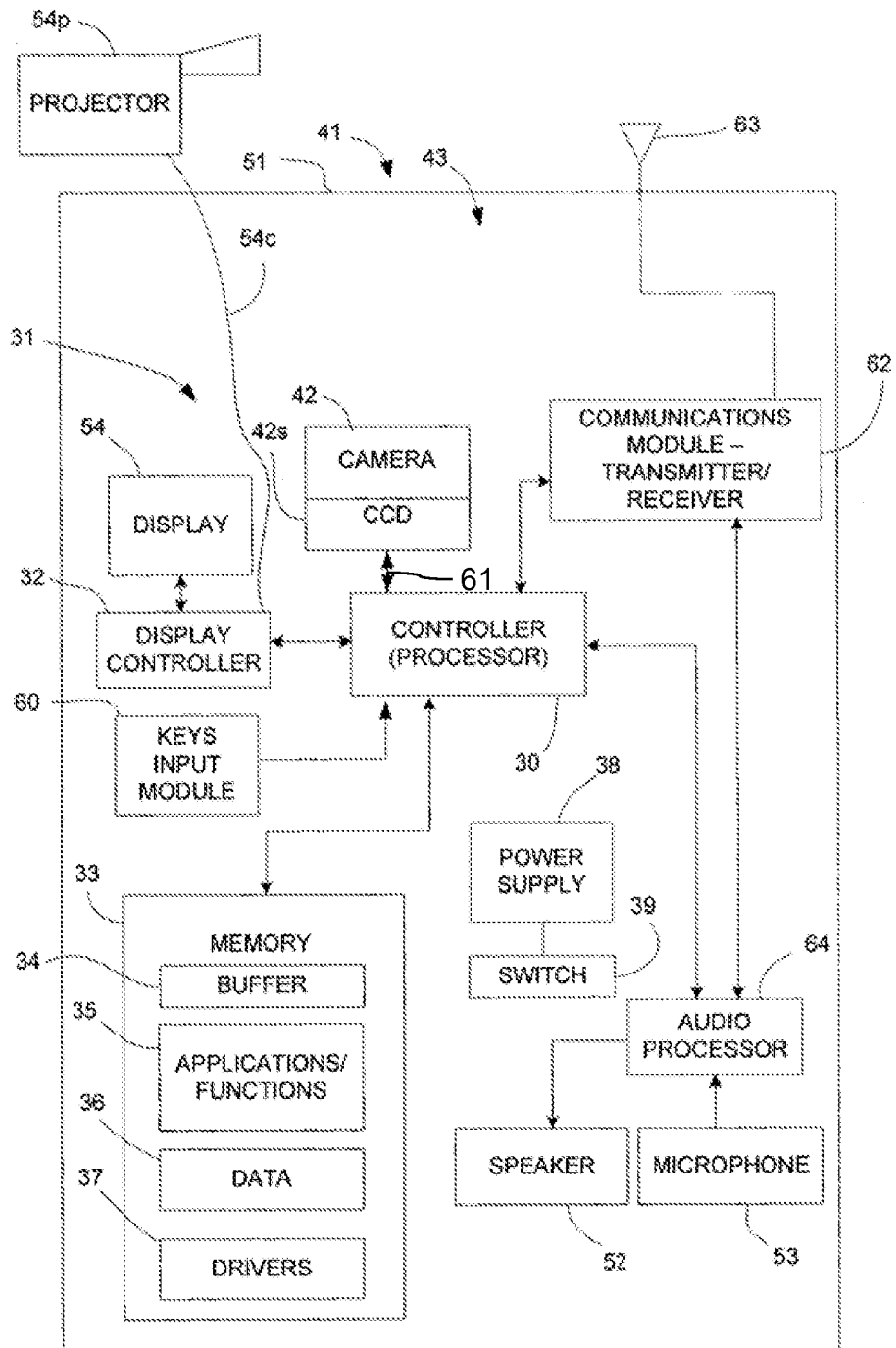
FIG. 8 is a schematic illustration of circuitry and associated parts of the mobile phone for carrying out operation thereof in a manner described below.

Referring to FIGS. 6-8, a portable communication device in accordance with an embodiment of the present invention is illustrated generally at 41 including a camera 42 and operating circuitry 43. The portable communication device 41 will be referred to below as a mobile phone. However, as was mentioned above, reference to "mobile phone" includes various other devices, such as, for example, those mentioned above. In outward appearance, for example, the mobile phone 41 is of one type of design or style; however, the features of the invention, as are described in further detail below, may be used in other types of mobile phones, such as those that include cases that open and close (sometimes referred to as a "flip phone," "sliding phones," etc.), and various other mobile phones that currently exist or may come into existence in the future.

The portable electronic device 41 may be any of many different types of such devices. As a mobile phone 41, for example, the portable electronic device includes case (housing) 51, speaker 52, microphone 53, display 54, e.g., liquid crystal display, light emitting diode display, or other display, and an on/off switch 39. The display may be a touch sensitive display that responds to touching by a finger, stylus or the like or to proximate positioning of a finger, stylus or the like relative to the display, and such response may be, for example, an electrical input to the operating circuitry 43.

The portable electronic device also may include a number of keys (not shown), which may be "hard keys" such as the on/off switch 39, one or more buttons, switches, "soft keys" that may have several different functions, rockers, slides, touch pad, etc., as are known in the field of such portable electronic devices. Two exemplary hard keys are shown at 56. Alternatively, the keys may be virtual keys that are shown on the display 54, depending on the current functioning of the portable electronic device, as is known in the field of such portable electronic devices, e.g., mobile phones. The keys may include a number of keys having different respective functions, such as, for example, navigating on the display, selecting, dialing and/or initiating a phone call, answering a phone call, inputting information, e.g., a text message, contact information (name, address, email address, telephone number, etc), scrolling through information shown on the display 54, initiating an operation of the portable electronic device, etc.

The display 54 may include a GUI (graphical user interface) on which a number of different icons representing respective functions, applications or the like (collectively referred to as functions below), e.g., camera, email, calendar, contacts, messages, games, etc. If the display 54 is a touch sensitive display, the pressing of an icon, for example, also can select the given function or application represented by the touched icon.

A key or an icon may be a shutter release to take a picture using the camera 42 and to provide for operation of the portable electronic equipment to show an enlarged view of differing part(s) of images, as is described in further detail below.

FIG. 8 illustrates operating circuitry 43 of the mobile phone 41. Such operating circuitry is exemplary. There are many types of mobile phones and other electronic devices with which the invention may be used, and appropriate operating circuitry may be included in such other electronic devices to carry out the invention. It will be appreciated that the operating circuitry 43 is similar to the electronics portion 22 of the computer system 20 illustrated and described above with respect to FIG. 2. As the electronic device 41 of FIG. 8 is a mobile phone, the operating circuitry 43 includes a keys input module 60 to receive inputs from various keys of the mobile phone. The keys may be, for example, the hard keys 56 (FIG. 6) and/or other hard keys (not shown) and/or virtual keys that are shown on the display, such as a conventional 12-key dialing keypad formed on a touch-sensitive display 54. The keys input module also may receive other inputs, such as, for example, inputs from touching an icon to carry out an application that is represented by the icon on the display 54.

The operating circuitry 43 also may include a connection 61 to the camera 42 and, for example, to the shutter 42*s*, e.g., an electronic shutter of the camera. The camera also may include a charge coupled device (CCD) or other image sensor. The connection 61 is provided to the controller (processor) to receive images that are sensed or picked up as, for example, photographs from the camera. The images may be stored in the memory 33, e.g., as was discussed above.

Additionally, as a mobile phone-type electronic device 41, the operating circuitry 43 also may include a communications module 62 with a transmitter/receiver, e.g., a transceiver to send and to receive communications with respect to an antenna 63. The communications module 62 is coupled to the controller 30 and may be controlled by the controller, as is conventional. Additionally, the communications module 62 is coupled to an audio processor 64, which may provide audio output via the speaker 52 and receive audio input from the microphone 53.

The camera 42 may include a lens, shutter 42*s*, image sensor, e.g., a digital image sensor, such as, for example, a CCD (charge coupled device), a CMOS device, or another image sensor. The camera may be a conventional camera of a type used in mobile phones or some other type of camera. Images that are sensed by the image sensor may be provided the controller 30 for use in the manner described further below. The camera 42 also may be associated with a shutter release mechanism, e.g., a given key or icon, that may function in a sense to "take a picture" when it is pressed by a user while the mobile phone 41 is operating in a photographic mode (sometimes referred to as camera mode). For example, pressing the shutter release key would save in a buffer, for example, the current image being sensed by the image sensor. Additionally, or alternatively, the camera may store in a buffer a number of images before and/or after the shutter release key is pressed, including the image received when the shutter release key is pressed, e.g., upon pressing the shutter release key is pressed.

The display controller 32 responds to inputs from a touch sensitive display 54 or from another type of display that is capable of providing inputs to the controller. Thus, for example, touching of a stylus or a finger to a part of a touch sensitive display, e.g., to select a song in a displayed list of songs, to select a contact in a displayed list of contacts, to select an icon or function in a GUI shown on the display may provide an input to the controller in conventional manner. The display controller 32 also may receive inputs from the controller 30 to cause images, icons, information, etc., to be shown on the display 54. The keys input module 60, for example, may be the keys 16 themselves and/or may be signal conditioning, decoding or other appropriate circuitry to provide to the controller 30 information indicating the operating of one or more keys 16 in conventional manner. The display may include either a direct view display or another type of display, for example, as was described above; one example of another display is a projector 54*p* that is connected at 54*c* to receive inputs from the display controller 32 to project images onto a screen for viewing, for viewing as a heads up display, or for some other viewing use.

A memory 33 is coupled to the controller 30. The memory may be a solid state memory, e.g., read only memory (ROM), random access memory (RAM), SIM card, etc., or memory that maintains information even when power is off and that can be selectively erased and provided with more data, an example of which sometimes is referred to as an EPROM or the like. The memory may be some other type device. The memory 33 includes a buffer memory 34 (sometimes referred to herein as buffer). The memory 33 may include an applications or functions storing section or function 35 to store applications programs and functions programs or routines for carrying out operation, e.g., servicing of routines, of the mobile phone 41 via the controller 30. The memory 33 also may include a data storage section or function 36 to store data, e.g., contacts, numerical data, pictures, and/or virtually any other data for use by the mobile phone 41. A drivers section 37 of the memory 33 may include various drivers for the mobile phone 41, for communication functions and/or for carrying out other functions of the mobile phone.

As is described further below, the buffer 34 may be used to save photographs from the camera 42 and/or for other purposes. The buffer 34 may be a part of the memory 33, e.g., specified address locations in a memory device, or part of the data storage section 36, etc., may be a separate memory device in the mobile phone 41, or may be otherwise provided to carry out the functions described further below.

The mobile phone 41 also includes a power supply 38 that may be coupled to provide electrical power to the operational circuitry 43 upon closing of the on/off switch 39.

For telecommunication functions and/or for various other applications and/or functions as may be selected from a GUI, the mobile phone 41 may operate in a conventional way. For example, the mobile phone may be used to make and to receive telephone calls, to play back songs, pictures, videos, movies, etc., to take and to store photographs or video, to prepare, to save, to maintain, and to display documents and databases such as a contacts or other database, to browse the Internet, to maintain a calendar, etc.

As a mobile phone electronic device 41, the operating circuitry may carry out the standard functions of a conventional mobile phone in the usual manner. Additionally, the image comparison and highlighting of image portions to provide a difference image, as is discussed elsewhere herein also may be carried out by the mobile phone.

Figures 9, 10:
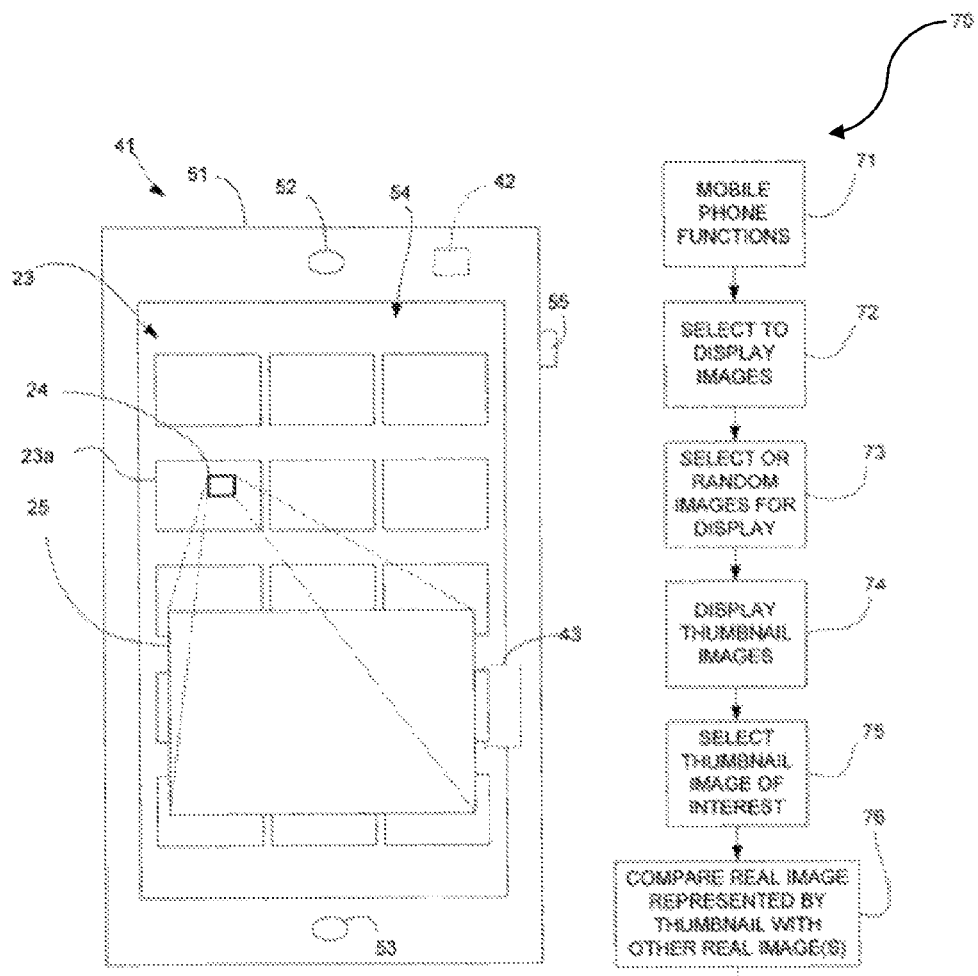
FIG. 9 is a schematic illustration of a mobile phone electronic device showing operation of the display providing an enlarged difference image, and original sized view of a difference image within a thumbnail image.
FIG. 10 is a schematic flow chart or logic diagram illustrating exemplary logic for carrying out operation of the mobile phone according an embodiment of the invention.

FIG. 9 illustrates the mobile phone 41 in a manner similar to the illustrations in FIGS. 2 and 6 in the sense that a number of thumbnails 23 are shown on the display 54, including a selected thumbnail 23*a*. As is seen in FIG. 9, the operating circuitry 43 has carried out the above-described functions to determine a difference image 24 in the selected thumbnail 23*a* and has caused to be shown on the display an enlarged difference image 25, as has been described above, for example, with respect to FIGS. 1-5.

FIGS. 10-14 illustrate schematically logic or computer program flow chart type diagrams representing steps carried out by the electronic devices, e.g., computer system 20, mobile phone 41 and other electronic devices practicing the invention. These diagrams and the functions are described in further detail below. It will be appreciated that these diagrams and the steps and order of steps presented therein are exemplary and other similar logic and/or steps may be carried out in accordance with the invention to obtain the comparing of images, determining difference images and showing the difference images and/or enlarged difference images on a display. It also will be appreciated that a person who has ordinary skill in the art would be capable of writing appropriate computer language code or programs in the appropriate computer language, etc., to carry out the logic or steps represented in and described with respect to the logic diagrams or computer program flow charts illustrated and described herein. It also will be appreciated that the terms logic diagram, logic, computer program, computer program flow chart, or flow chart may be used synonymously unless otherwise indicated expressly or by context.

Referring to FIG. 10, a flow chart 70 is a relatively high level flow chart showing steps in accordance with an embodiment of the invention. In the description of the several flow charts, reference to a block and to a step may mean the same unless otherwise indicated expressly or by context. At block 71 conventional mobile phone functions may be carried out, including, for example, waiting for something to occur, e.g., receiving or making a phone call, text message, email, photograph, etc. At block 72 the mobile phone may be operated or set to select a function or operation to display images. At block 73 specific images may be selected for display on the display of the electronic device or the electronic device may be set to display random images, e.g., that may be stored in memory or otherwise received by the electronic device. At block 74 thumbnail images are displayed. The thumbnails may be representations of full images that are stored in the memory, for example, The thumbnail images may be shown on the display of the electronic device in an array, e.g., as was described above or in some other fashion. At block 75 a thumbnail of interest is selected, e.g., by moving a cursor over or to point to the selected thumbnail or in some other manner. At block 76 the real image that is represented by the selected thumbnail image is compared with one or more other real images. At block 77 a determination is made of which part or parts of the selected image differentiates from the other image(s) with which compared. At block 78 an enlarged view of the part(s) that differentiate from other image(s) is displayed.

Figure 11:
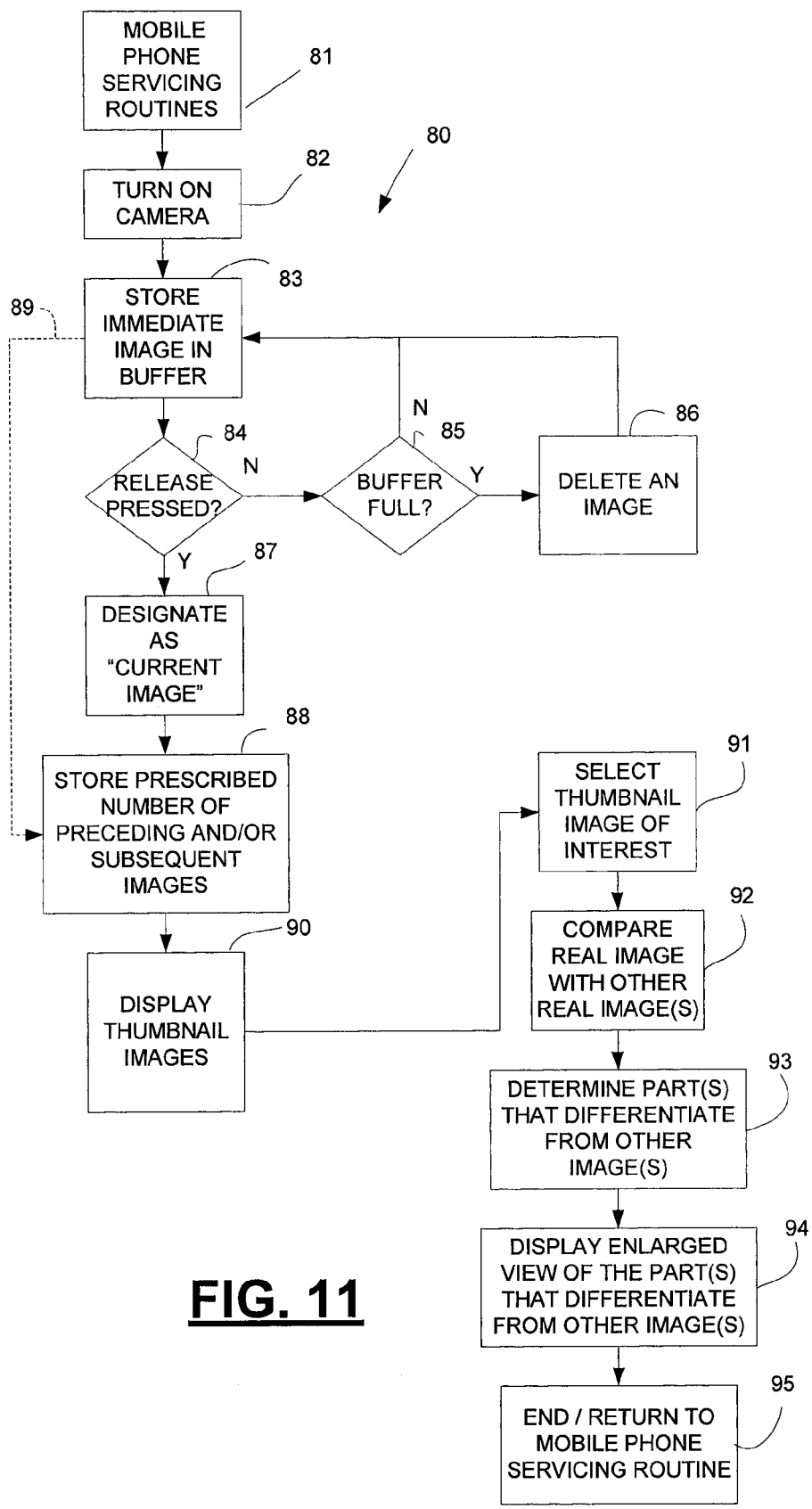
FIG. 11 is a schematic flow chart or logic diagram illustrating further details of exemplary logic according to which images, e.g., from an image buffer, may be stored, compared and differing part(s) displayed.

FIG. 11 is a flow chart 80 that uses the method described herein to differentiate thumbnail images from each other and also may use images that are taken by a camera 42 of a mobile phone, for example. The camera 42 may take a continuous sequence of images while it is operational and a selected image may be the image occurring when the shutter release is pressed, as is described further below. Since the images are taken continuously, it is likely that many of them will be very similar, even the same; and the present invention may be used to facilitate differentiating the images, as is described herein.

At block 81 the mobile phone, e.g., 41 (FIGS. 6-8), may be in a rest or other mode servicing various mobile phone routines. At block 82 the camera, e.g., 42, is turned on. At block 83 an image received by the camera is stored in an image buffer, e.g., 34 (FIGS. 2 and 8). At block 84 an inquiry is made whether the shutter release associated with the camera has been pressed. If not, then at block 85 an inquiry is made whether the buffer is full. If it is not, then at block 83 another image is stored, and so on. If at block 85 the buffer is found to be full, then at block 86 an image is deleted from the buffer, and the routine continues until the shutter release has been found released at block 84. At block 87 the image in the buffer upon the pressing of the shutter release is designated as a "current image." At block 88 a prescribed number of images preceding and/or subsequent to the current image are stored or designated; line 89 from block 83 assures that the images stored in the buffer are provided to block 88. Again, it is noted that since the images that are stored are designated may sequentially precede and/or follow the current image, it is likely that those images are quite similar or nearly the same; and the invention facilitates differentiating a selected image from other images in the group of images preceding and/or following the current image.

At block 90 the images from block 88 are displayed as thumbnail images, e.g., on display 21 (FIG. 2) or 54 (FIGS. 6-8). At block 91 the thumbnail of interest (23a, for example) is selected. At block 92 the real image of the selected thumbnail is compared with other real image(s). At block 93 a determination of part(s) that differentiate the selected image from other image(s) is made. At block 94 the system, e.g., the electronic device 10, 20, 41, for example, displays the enlarged view of the part(s) that differentiate from other image(s), e.g., the enlarged difference image. At block 95 after the user is ready to return to the mobile phone service routine, the flow chart 80 ends and returns to block 81, e.g., when the user has enough information from the enlarged difference image or desires to select a different thumbnail as a selected image.

Figure 12:
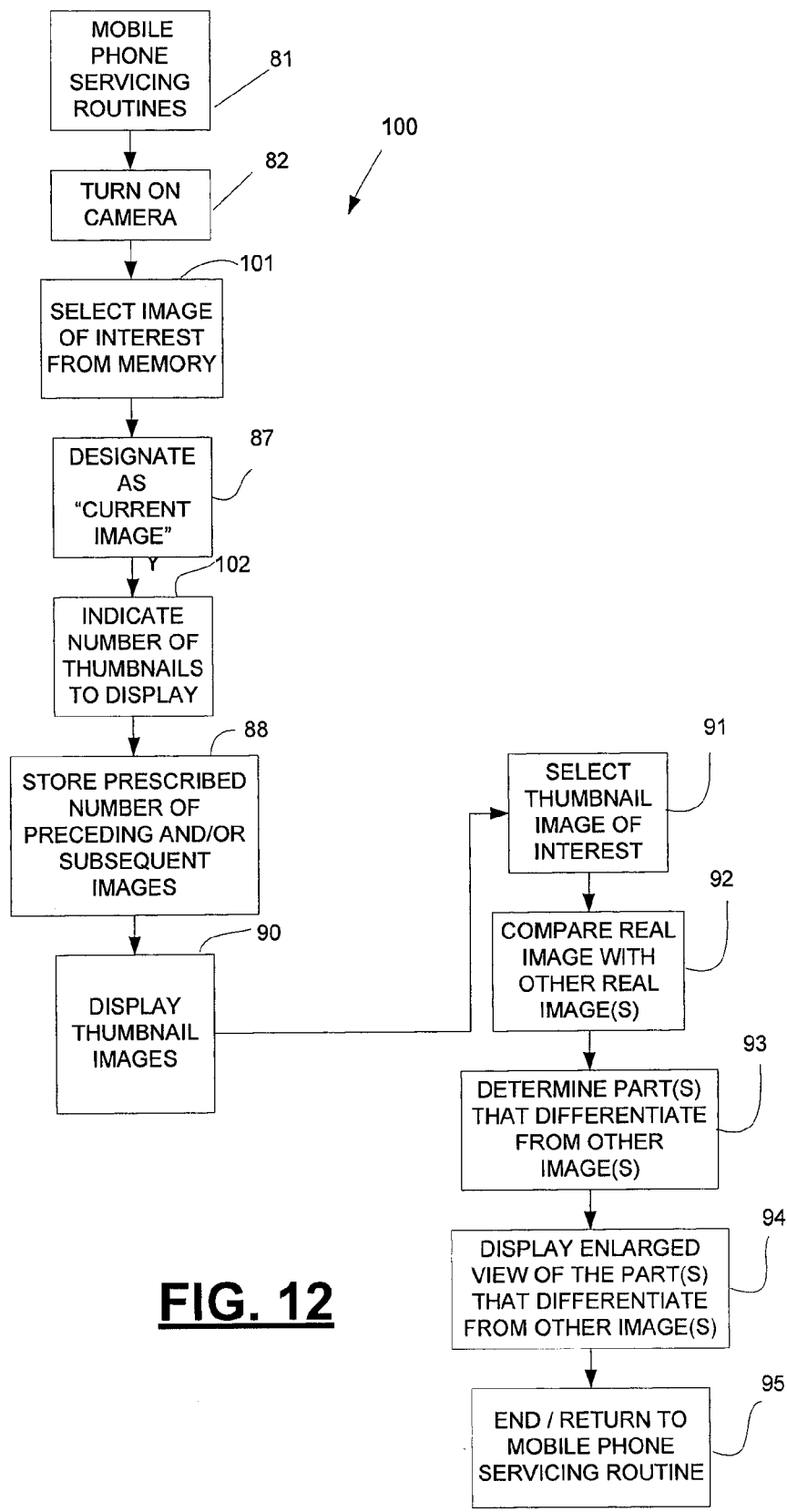
FIG. 12 is a schematic flow chart or logic diagram illustrating further details of exemplary logic according to which a number of images preceding and/or subsequent to an image of interest may be stored, compared and differing part(s) displayed.

Turning to FIG. 12, a flow chart 100 is illustrated. The flow chart 100 is similar to the flow chart 80 (FIG. 11), except in the flow chart 100 images are retrieved from memory, e.g., memory 33 (FIGS. 2 and 8), rather being a group of images that are retrieved as the camera 42 takes a continuous sequence of pictures. At block 81 the mobile phone is at rest or otherwise is carrying out one or more mobile phone service routines. At block 82 the camera 42 is turned on to provide for operation of imaging software of the mobile phone. Alternatively, the camera need not be turned on, but the imaging or image related software and functions of the flow chart 100 would be turned on. At block 101 an image of interest is selected from memory, e.g., memory 33. The image of interest may be a specified known image, a selected image from a group of images that are scrolled through, an image from a group of thumbnails, etc. At block 87 the selected image is designated as a "current image." At block 102 the user may indicate a number of thumbnails that are to be displayed, e.g., on the display 21, 54 of the electronic device, not necessarily which thumbnails but the number of thumbnails. At block 88 a plurality of thumbnail images that precede or are subsequent to the current image are stored in the identified and/or are stored in memory, e.g., in the buffer 34 for convenient expedient retrieval, etc. At block 90, thumbnails of the prescribed number of images that had been stored or designated at block 88 are displayed, e.g., by the display 21 or 54. The functions of blocks 91 through 95 may be the same as or similar to the functions of blocks 91 through 95 in the flow chart 80 of FIG. 11.

Figure 13:
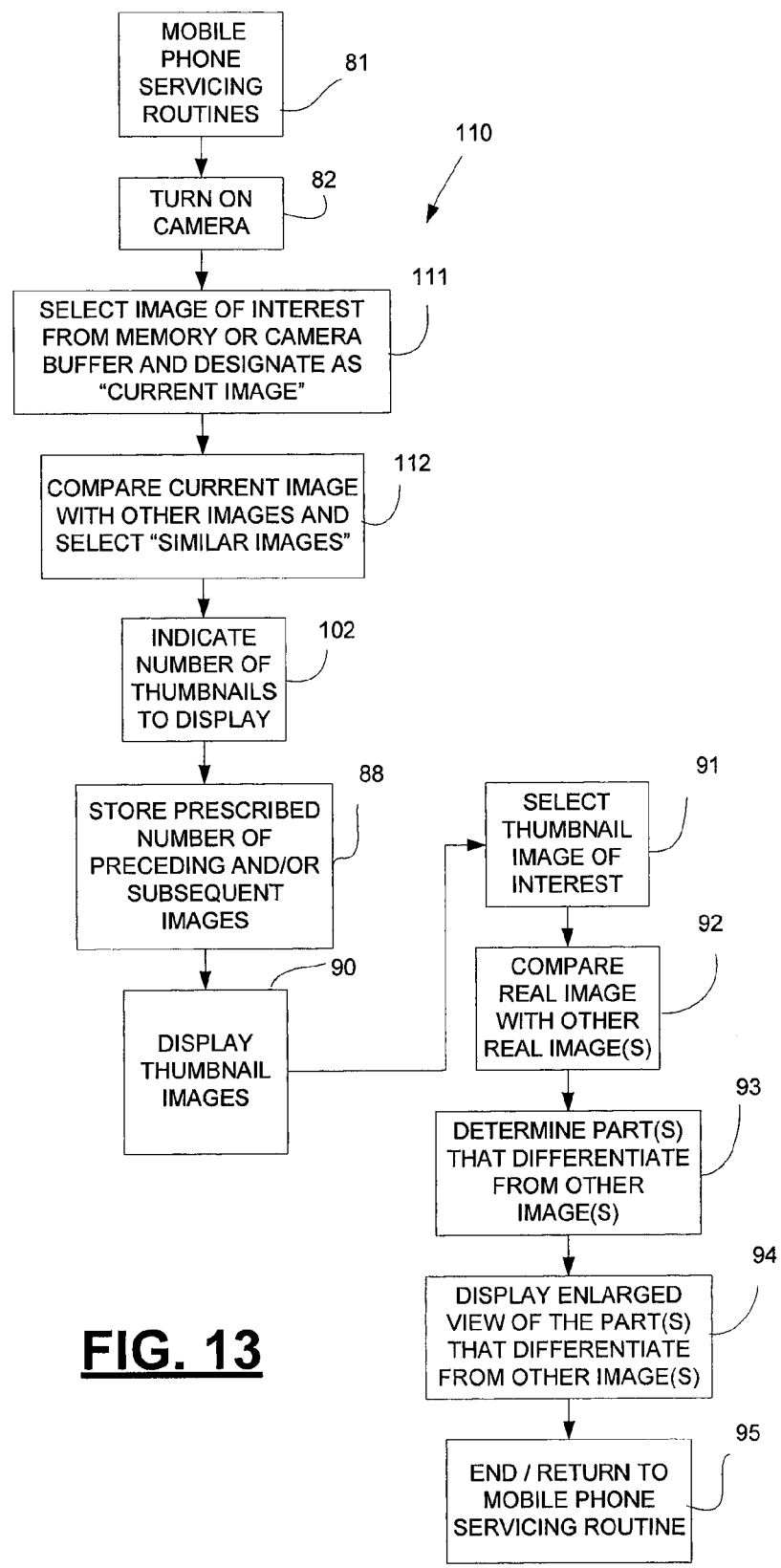
FIG. 13 is a schematic flow chart or logic diagram illustrating further details of exemplary logic according to which a number of images may be preliminarily compared to select images for consideration to determine differing part(s) for display.

Referring to FIG. 13, a flow chart 110 is illustrated. In the flow chart, logic or method depicted in FIG. 13, a current image is compared with other images to determine a number of similar images with which the differentiating functions may be carried out as described herein to show the difference(s) between a selected image and other similar images.

Some of the blocks in the flow chart 110 of FIG. 13 are the same or similar to those described above with respect to the flow charts 80 and 100 of FIGS. 11 and 12. At block 81 the mobile phone is at rest or otherwise is carrying out one or more mobile phone service routines. At block 82 the camera 42 is turned on to provide for operation of imaging software of the mobile phone. Alternatively, the camera need not be turned on, but the imaging or image related software and functions of the flow chart 100 would be turned on. At block 111 an image of interest is selected from memory or from the camera buffer, e.g., memory 33, buffer 34, etc., and that image of interest is designated as a "current image." At block 112 the current image is compared with other images, either from memory, from some other source, from images continuing to be obtained by the camera 42, etc., and "similar images" to the current image are selected. At block 102 the number of thumbnails to be displayed is indicated, e.g., by the user inputting a number or by a number already being predetermined in the electronic device. At block 88 a prescribed number of preceding and/or subsequent images relative to a selected image or the current image is stored, and thumbnails thereof are displayed at block 90. As was mentioned above, the number of thumbnails to be displayed at block 102 determines how many thumbnails of the prescribed number of preceding and/or subsequent images stored at block 88 will be displayed. The functions of blocks 91 through 95 may be the same as or similar to the functions of blocks 91 through 95 in the flow chart 80 of FIG. 11.

The images that are compared to determine similar images may be based on subject matter or content of the images, coloring, e.g., reddish sunset, bright sunlight, indoor incandescent lighting, near field (zoomed) or far field (wide angle), focus extent, and so on. Also, these features and/or other features also may be used to determine differentiating portions of a selected image relative to one or more other images and to provide for preparing the difference image and enlarged difference image.

Figure 14:
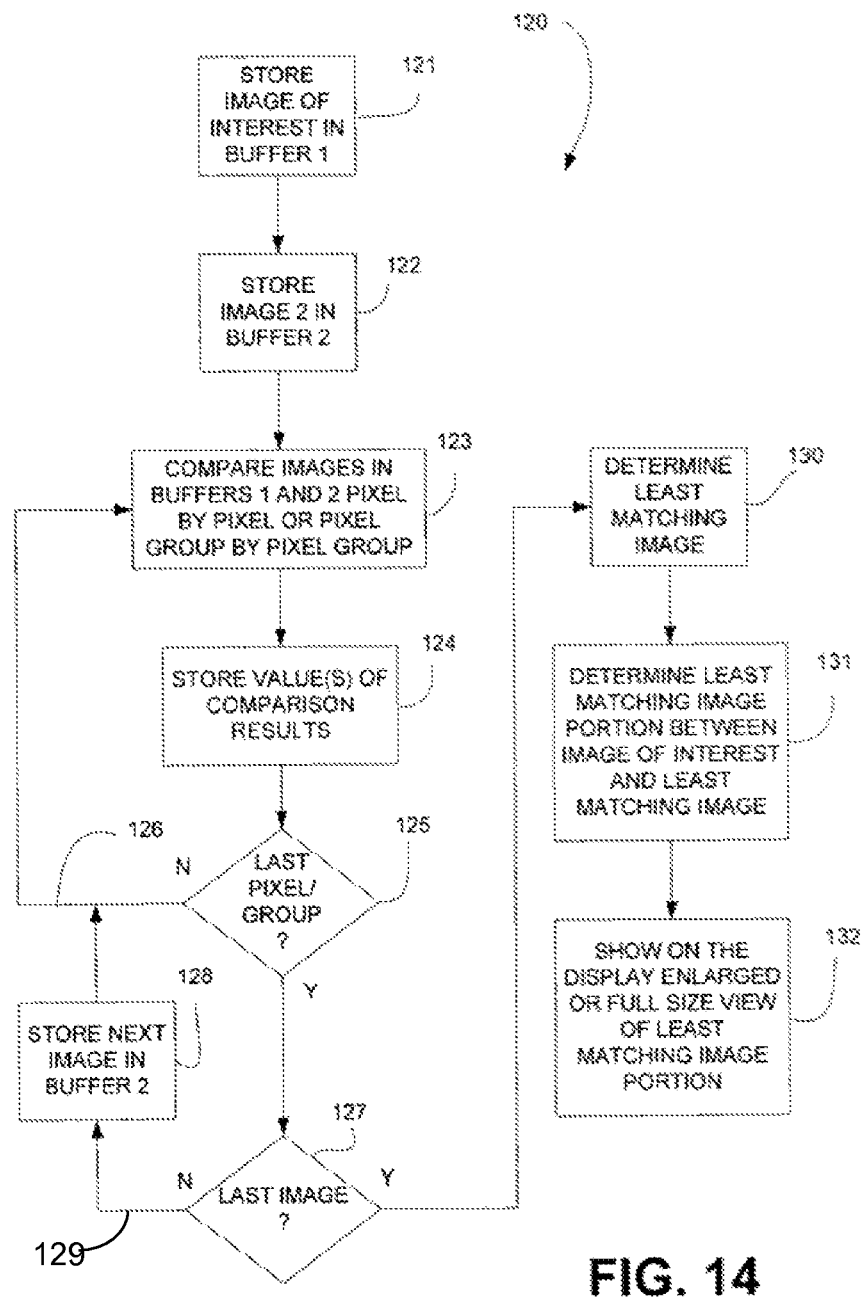
FIG. 14 is a schematic flow chart or logic diagram illustrating an example of logic that may be used to compare images and to display enlarged or full size view of differing image portion(s).

In FIG. 14 is an example of a flow chart or logic 120 for comparing two images on a pixel by pixel basis to determine the differences between the images so that a difference image and an enlarged difference image can be obtained. This is one example of using a comparator to make the comparison, e.g. using the comparator 13 (FIG. 1), the computer system 20 (FIG. 2), the mobile phone 41 or other electronic device to differentiate between a selected image and one or more images. The comparison may be made between respective full images (also referred to sometimes herein as real images) or between thumbnails. The comparison may be made between two images at a time or between a selected image and several images simultaneously or substantially simultaneously.

At block 121 an image of interest is stored in a first buffer (buffer 1), such as the buffer 34 (FIGS. 2 and 8) or some other memory device or location in the memory 33. At block 122 a second image is stored in another buffer (buffer 2), e.g., buffer 34. At block 123 a comparison of the two images in the respective buffers is made on a pixel by pixel basis or group of pixels by group of pixels basis to determine whether the compared pixels or groups of pixels are identical, nearly identical or not at all identical. At block 124 a value representing the results of the comparison is stored. For example, if the pixels are identical, a value of 10 may be stored for that/those pixels. If the pixels are entirely different, a value of 1 may be stored. If the pixels are similar but not identical, a value between 10 and 1 may be stored. The range of values may be smaller or larger than the ten unit values. At block 125 an inquiry is made whether the last pixel or group of pixels of the compared images has been reached; if not, then loop line 126 is followed back to block 123. If the last pixel or pixel group has been compared and the appropriate value stored therefor, then at block 127 an inquiry is made whether the image that was in buffer 2 (block 122) is the last image with which the image of interest in buffer 1 is to be compared. If not, then loop line 129 is followed to block 128; and another image is stored in buffer 2 as the second image (or image 2) for comparison with the image of interest from buffer 1; and the procedure just described continues at block 123 to compare the image of interest with the next stored image, and so forth.

If at block 127 the last image for comparison with the image of interest has been compared, then at block 130 a determination of the least matching image is made. This may be done by comparing the values stored for each comparison between the image of interest and the respective image stored in buffer 2. For example, a large total value of a given comparison may be used in an embodiment to identify the least matching image, i.e., the particular image that was in buffer 2 at the time of such comparison. As another example, the comparison that has the greatest amount of high number values, e.g., number 10 or a range of numbers 8 through 10, may be used to determined the least matching image, i.e., the image that was in buffer 2 at the time of such comparison. Other approaches also may be used determine the least matching image, e.g., based on focus, near/far field, color, image content, and so on.

At block 131 a determination is made between the least matching image and the image of interest as to which portions thereof are least matching, e.g., least the same or least similar, etc. That portion is to be the difference image 24 (FIGS. 2 and 9). The difference image may be constituted not only of the portion of the image of interest that is most differentiated from a corresponding portion of the least matching image, but also may include some contextual material. For example, the difference image 24 may be a prescribed number of pixels in respective directions; and the contextual information or material may be a predetermined or computed percentage of such number of pixels. For example, if the size of the difference image is rectangular in the amount of x by y pixels, the contextual additional amount of the difference image may be an additional one half x and one half y numbers of pixels in each direction.

The computer system 20, mobile phone 41, etc., may enlarge the difference image and show it on the display (21, 54), as is indicated at block 14.

It will be appreciated that portions of the present invention can be implemented in hardware, software, firmware, or a combination thereof. In the described embodiment(s), a number of the steps or methods may be implemented in software or firmware that is stored in a memory and that is executed by a suitable instruction execution system. If implemented in hardware, for example, as in an alternative embodiment, implementation may be with any or a combination of the following technologies, which are all well known in the art: discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions or blocks in flow charts may be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The logic and/or steps represented in the flow diagrams of the drawings, which, for example, may be considered an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The above description and accompanying drawings depict the various features of the invention. It will be appreciated that the appropriate computer code could be prepared by a person who has ordinary skill in the art to carry out the various steps and procedures described above and illustrated in the drawings. It also will be appreciated that the various terminals, computers, servers, networks and the like described above may be virtually any type and that the computer code may be prepared to carry out the invention using such apparatus in accordance with the disclosure hereof.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

I claim:

1. An image processing system, comprising
a memory adapted to store images,
a processor,
operative programming adapted to compare images and to prepare a difference image,
a selector configured to select an image among a plurality of images as a selected image,
a comparator configured to compare the selected image with at least one other image to identify at least one generally corresponding part of the images that differentiate the images from each other, and
an output configured to provide from the identified part of the selected image the difference image that
is smaller in image size than the selected image, and
includes the identified differentiating part of the selected image
to facilitate showing a difference between the selected image and the at least one other image with which the selected image is compared by the comparator,
wherein the output is configured to provide for showing on a display or projecting simultaneously the plurality of images in thumbnail form including the selected image, the difference image enlarged relative to the size of a thumbnail representation of the selected image, and the thumbnail representation of the selected image with a mark-up of the part that is used for the difference image to facilitate identifying the approximate location in the selected image of the difference image,
wherein the comparator is adapted to carry out the comparison on a pixel by pixel basis of respective images or thumbnails or a group of pixels by group of pixels basis of respective images or thumbnails.

2. The system of claim 1, wherein the difference image is cropped from the selected image, wherein the difference image includes a contextual image portion to facilitate identifying the approximate location in the selected image of the difference image, and further comprising a display or projector for displaying or projecting images.

3. The system of claim 1, wherein after being selected the selected image is presented with a mark-up of the part that is used for the difference image to facilitate identifying the approximate location in the selected image of the difference image.

4. The system of claim 1, wherein the comparator is configured to compare the selected image or a thumbnail representation of the selected image with another image or another thumbnail representation of such another image to identify at least one corresponding part in the compared thumbnails or images that differ from each other to provide the difference image.

5. The system of claim 1, further comprising a camera adapted to provide images.

6. The system of claim 1, wherein the difference image is cropped from the selected image to be smaller in image size than the selected image and includes the identified part of the selected image to facilitate showing a difference between the selected image and the at least one other image with which the selected image is compared by the comparator.

7. The system of claim 1, wherein the comparator is configured to compare the selected image or a thumbnail representation of the selected image with the plurality of other images or thumbnail representations of such other images to determine based on a relationship to the selected image or thumbnail representation of the selected image a specified other image or thumbnail representation of the specified other image for comparison with the selected image or thumbnail representation of the selected image.

8. The system of claim 1, wherein the selector comprises comparing circuitry and operative programming to select from among a number of images a number of similar images for displaying as thumbnails from which to select a selected image.

9. A mobile phone including circuitry for making and receiving telephone calls, and the system of claim 1.

10. An image processing system, comprising
a display adapted to show a plurality of thumbnail representations of respective images,
a selector adapted to select at least one of the images by selecting a respective thumbnail,
a comparator adapted to compare the selected image or the thumbnail representation of the selected image with another image or another thumbnail representation of such another image to identify at least one generally corresponding part in the compared thumbnails or images that differ from each other to provide a difference image, and
operating circuitry adapted to show simultaneously on the display the plurality of thumbnail representations, an enlarged image of the difference image relative to the size of the thumbnail representations and in a thumbnail of the selected image a highlighted or otherwise designated portion corresponding to the difference image.

11. Electronic equipment system, comprising
a camera,
operating circuitry, including
memory adapted to store a plurality of images received by the camera, a selector to select a respective image, and a comparator adapted to analyze respective images to determine generally comparable part(s) that differ, and an output adapted to provide a difference image of the differing part(s) between compared images, and further comprising a display or projector, and wherein the operating circuitry is adapted to provide respective thumbnails of a plurality of images to be shown on the display or projected by the projector, wherein the display or projector is adapted to show simultaneously the plurality of images in thumbnail form including the selected image, the difference image together with contextual image in enlargement relative to the size of the respective thumbnails, and in a thumbnail of the selected image a highlighted or otherwise designated portion corresponding to the difference image.

12. A method of displaying images, comprising
displaying a number of thumbnails of real images,
selecting a thumbnail of interest,
comparing the real image represented by the thumbnail with another image to determine differences, and
displaying simultaneously the number of thumbnails of real images, a view of the differing part(s) of the real image represented by the selected thumbnail of interest in enlarged size relative to the size of the thumbnail, and in the selected thumbnail a highlighted or otherwise designated portion corresponding to the differing part(s).

13. The method of claim 12, said displaying a view of the differing parts further comprising displaying only the differences as a difference image together with contextual image.

14. The method of claim 12, said steps being carried out on a mobile phone or on a general purpose computer.

* * * * *